(12) United States Patent
Im et al.

(10) Patent No.: US 10,974,578 B2
(45) Date of Patent: Apr. 13, 2021

(54) DOOR IMPACT BEAM

(71) Applicants: Hyundai Motor Company, Seoul (KR); Kia Motors Corporation, Seoul (KR)

(72) Inventors: Hee Jin Im, Gyeonggi-do (KR); Hyun Sup Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 219 days.

(21) Appl. No.: 16/176,656

(22) Filed: Oct. 31, 2018

(65) Prior Publication Data
US 2020/0001690 A1 Jan. 2, 2020

(30) Foreign Application Priority Data
Jun. 27, 2018 (KR) ........................ 10-2018-0073998

(51) Int. Cl.
*B60J 5/04* (2006.01)

(52) U.S. Cl.
CPC .................... *B60J 5/0444* (2013.01)

(58) Field of Classification Search
CPC ........ B60J 5/0412; B60J 5/0413; B60J 5/042; B60J 5/0422; B60J 5/0423; B60J 5/0429; B60J 5/0438; B60J 5/0443; B60J 5/0444
USPC .................................................. 296/187.12
See application file for complete search history.

(56) References Cited

U.S. PATENT DOCUMENTS

| | | | | |
|---|---|---|---|---|
| 4,090,734 A * | 5/1978 | Inami | ..................... | B60J 5/0437 296/146.6 |
| 5,600,931 A * | 2/1997 | Jonsson | .............. | E01F 15/0407 52/833 |
| 5,887,938 A * | 3/1999 | Topker | .................. | B60J 5/0444 296/146.6 |
| 5,992,922 A * | 11/1999 | Harbig | .................. | B60J 5/0444 296/146.6 |
| 6,290,282 B1 * | 9/2001 | Hortlund | ................ | B60J 5/0444 296/146.6 |
| 6,416,114 B1 * | 7/2002 | Topker | .................. | B60J 5/0443 296/146.6 |
| 7,086,686 B2 * | 8/2006 | Bullmann | .............. | B60J 5/0444 188/377 |
| 8,061,762 B2 * | 11/2011 | Arvidsson | .............. | B60J 5/0444 296/146.6 |
| 8,544,935 B2 * | 10/2013 | Wille | ..................... | B60J 5/0444 296/146.6 |

(Continued)

FOREIGN PATENT DOCUMENTS

FR 3052397 A1 * 12/2017 ............ B60J 5/0444
JP 10166860 A * 6/1998

(Continued)

*Primary Examiner* — Hilary L Gutman
(74) *Attorney, Agent, or Firm* — Mintz Levin Cohn Ferris Glovsky and Popeo, P.C.; Peter F. Corless

(57) ABSTRACT

A door impact beam is provided. The beam includes a beam body that has a W-shaped cross section and a reinforcement portion. The reinforcement portion is disposed in middle of the beam body and has a width greater than that of the beam body. Additionally, the reinforcement portion has first and second edges that are symmetrically convex with respect to a central axis of the beam body and the first and second edges have a curved streamlined shape.

10 Claims, 14 Drawing Sheets

(56) References Cited

U.S. PATENT DOCUMENTS

| | | | | |
|---|---|---|---|---|
| 10,099,541 B2* | 10/2018 | Baccouche | ....... | B29C 66/73754 |
| 2003/0178273 A1* | 9/2003 | Bullmann | .............. | B60J 5/0444 |
| | | | | 188/377 |
| 2004/0150249 A1* | 8/2004 | Gehringhoff | .......... | B60J 5/0444 |
| | | | | 296/146.6 |
| 2007/0102955 A1* | 5/2007 | Bodin | .................... | B60J 5/0425 |
| | | | | 296/146.6 |
| 2007/0145770 A1* | 6/2007 | Katou | .................... | B60J 5/0429 |
| | | | | 296/146.6 |
| 2009/0322117 A1* | 12/2009 | Arvidsson | ........... | B60R 21/0428 |
| | | | | 296/146.6 |
| 2012/0146359 A1* | 6/2012 | Wille | .................... | B60J 5/0444 |
| | | | | 296/146.6 |
| 2016/0059677 A1* | 3/2016 | Yamazaki | .............. | B60J 5/0429 |
| | | | | 49/501 |
| 2017/0210211 A1* | 7/2017 | Clausen | .................. | B60R 19/18 |
| 2017/0291476 A1* | 10/2017 | Schneider | .............. | B60J 5/0448 |
| 2018/0141415 A1* | 5/2018 | Baccouche | ........ | B29D 99/0003 |
| 2018/0162316 A1* | 6/2018 | Saito | ................. | B60R 21/23138 |
| 2019/0030586 A1* | 1/2019 | Hodoya | ................. | B60J 5/0444 |

FOREIGN PATENT DOCUMENTS

| | | | |
|---|---|---|---|
| JP | 2011251597 A | 12/2011 | |
| JP | 2015168349 A | 9/2015 | |
| WO | WO-2016046736 A1 * | 3/2016 | ............ B60J 5/0444 |

\* cited by examiner

DOOR IMPACT BEAM

CROSS-REFERENCE TO RELATED APPLICATION

This application is based on and claims the benefit of priority to Korean Patent Application No. 10-2018-0073998, filed on Jun. 27, 2018, the disclosure of which is incorporated herein in its entirety by reference.

TECHNICAL FIELD

The present disclosure relates to a door impact beam and, more particularly, to a door impact beam having a structure that increases a section modulus when a bending moment is applied, thereby improving strength or support load.

BACKGROUND

One of many important factors in vehicle design is to more safely protect a driver and passengers from impact during a vehicle collision. In particular, to reduce head, rib, and pelvic injuries of the driver and the passengers during side impacts, an optimal design of door structures has been actively researched. As one of such door structures, a door impact beam that absorbs the applied impact energy during the side impact may be mounted in a vehicle door in a longitudinal direction of the door. Such a door impact beam absorbs the impact energy by self-collapsing during the side impact, thereby reducing the impact transmitted to the passengers.

The door impact beam may be disposed between an inner panel and an outer panel of the vehicle door to secure sufficient bending strength. Additionally, the door impact beam may be divided into a steel tube type, a press type, and the like, according to manufacturing methods thereof. A steel tube type door impact beam has disadvantages of low productivity and high production cost due to the increased number of parts and welding.

On the other hand, a press type door impact beam is produced by forming a cold-rolled steel sheet using a cold press forming method, which has advantages of high productivity and low production cost. To secure the strength of the door impact beam sufficiently, it is advantageous for the press type door impact beam to have an M-shaped cross section. However, since a steel sheet having a high yield strength (e.g., 1180 MPa or higher) is subject to constraint conditions for cold press forming due to a strong spring-back phenomenon during the cold press forming, both side edges thereof may be inclined symmetrically outwardly. Thus, the press type door impact beam has a substantially W-shaped cross section, and the W-shaped cross section may remain the same in the longitudinal direction of the door impact beam.

Since the W-shaped cross section of the door impact beam according to the related art remains the same in the longitudinal direction, when a bending moment is applied to the door impact beam during the impact, both side edges of the W-shaped cross section may be easily unfolded in a lateral direction as indicated by a dotted line in FIG. 2. Thus, a section modulus of the door impact beam may be reduced and thus, the strength or support load of the door impact beam may significantly be reduced.

SUMMARY

The present disclosure provides a door impact beam having a structure that increases a section modulus when a bending moment is applied, thereby improving strength or support load.

According to an aspect of the present disclosure, a door impact beam may include: a beam body having a W-shaped cross section; and a reinforcement portion disposed in middle of the beam body and having a width greater than that of the beam body. The reinforcement portion may have first and second edges symmetrically convex with respect to a central axis of the beam body, and the first and second edges may have a curved streamlined shape.

The reinforcement portion may have a W-shaped cross section of which a width is greater than that of the W-shaped cross section of the beam body. The reinforcement portion may include a central web, and a pair of apexes symmetrically disposed on both sides of the central web. Each apex of the reinforcement portion may have a pair of beads and a groove disposed between the pair of beads, and the pair of beads may have the same height. Each bead and the groove may be rounded with a predetermined radius. Both sides of each apex of the reinforcement portion may be connected to an inner sidewall and an outer sidewall, respectively.

Additionally, the beam body may include a central web, and first and second apexes symmetrically disposed on both sides of the central web. The central web and the first and second apexes of the beam body may be rounded with a predetermined radius. The beam body may be divided into a first portion and a second portion by the reinforcement portion. The reinforcement portion may have a center portion located at the center of the door impact beam in a longitudinal direction of the door impact beam. A first end of the reinforcement portion may meet with the first portion of the beam body, and a second end of the reinforcement portion may meet with the second portion of the beam body. Each apex of the reinforcement portion may be continuously connected to each apex of the beam body, and a width of each apex of the reinforcement portion may be greater than that of each apex of the beam body. The central web of the reinforcement portion may be continuously connected to the central web of the beam body.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
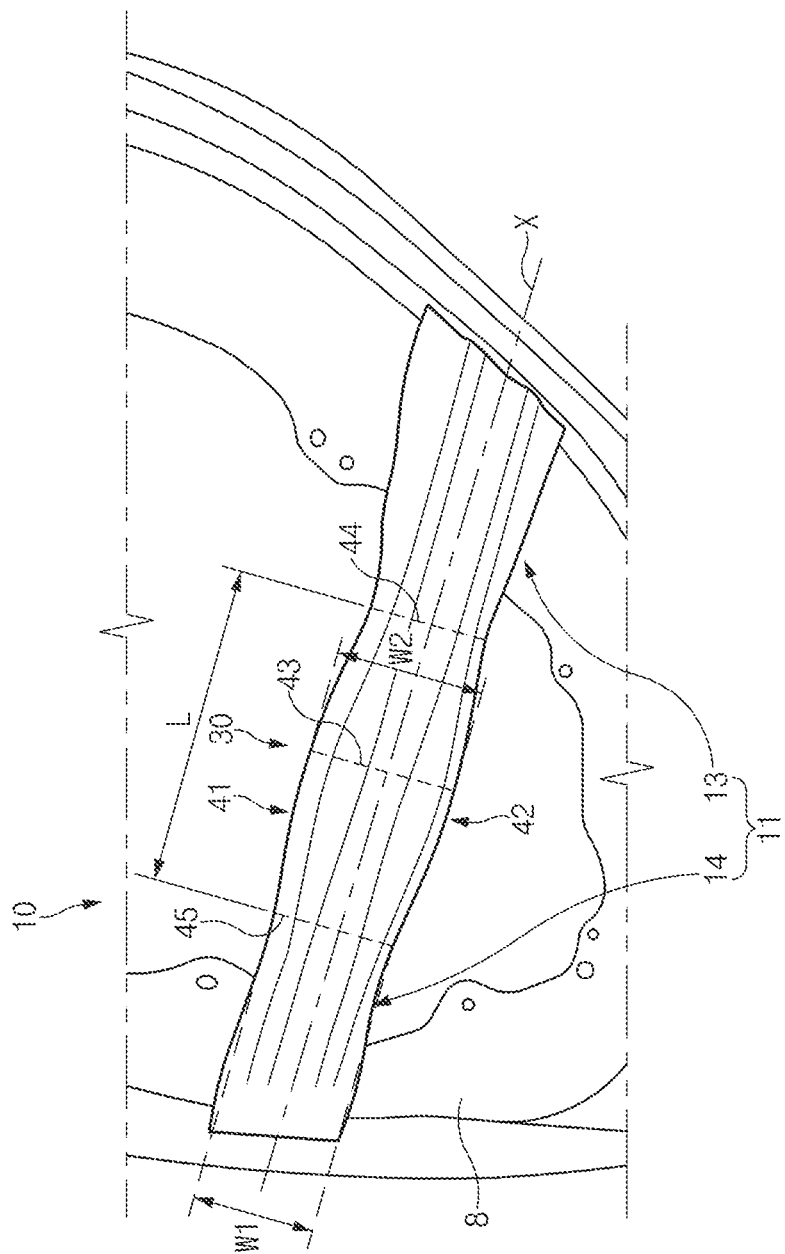
FIG. 1 illustrates a state in which a door impact beam according to an exemplary embodiment of the present disclosure is mounted on an inner panel of a vehicle door.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
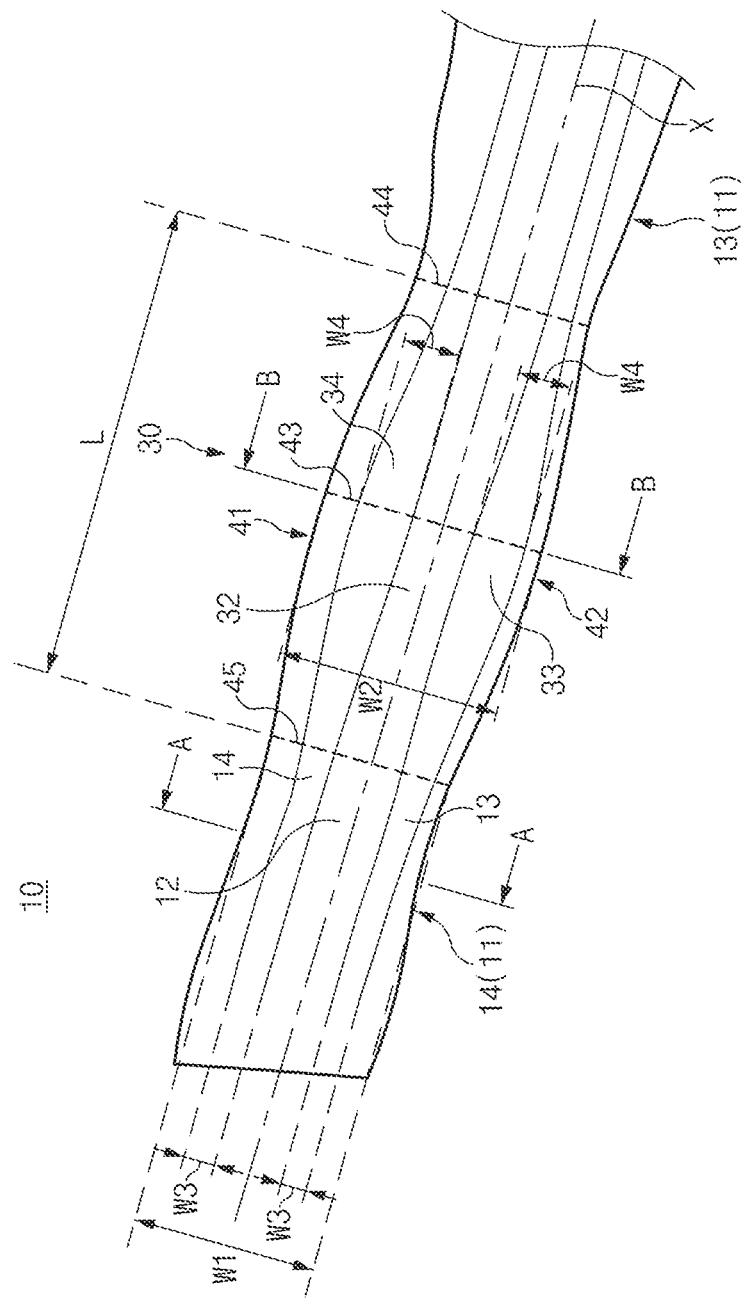
FIG. 2 illustrates a plan view of a door impact beam according to an exemplary embodiment of the present disclosure.

As illustrated in FIG. 1, both ends of a door impact beam 10 may be fixed to an inner panel 8 of a vehicle door by welding or using fasteners to mount the door impact beam 10 on the inner panel 8. Referring to FIGS. 1 and 2, the door impact beam 10 according to an exemplary embodiment of the present disclosure may include a beam body 11 that extends in a longitudinal direction of the vehicle door, and a reinforcement portion 30 disposed in the middle of the beam body 11. The beam body 11 may be divided into a first portion 13 and a second portion 14 by the reinforcement portion 30. The first portion 13, the reinforcement portion 30, and the second portion 14 may be continuously connected in a line.

Figure 3:
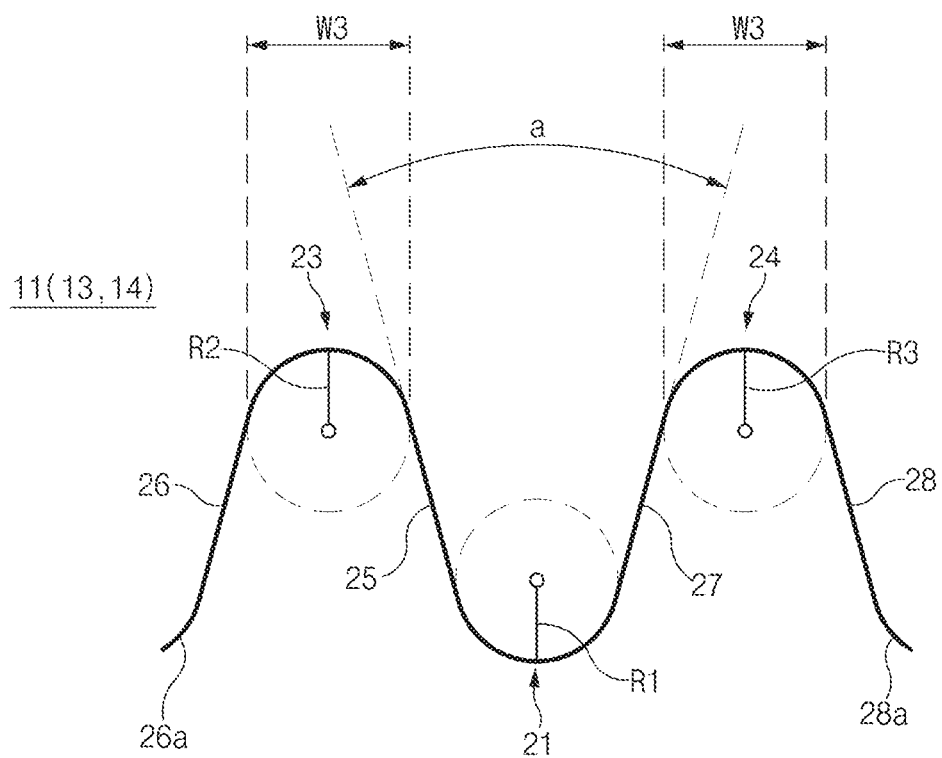
FIG. 3 illustrates a cross-sectional view, taken along line A-A of FIG. 2 according to an exemplary embodiment of the present disclosure.

As illustrated in FIG. 3, the first portion 13 and the second portion 14 of the beam body 11 may have a W-shaped cross section of the same shape and of the same size. The shape and size of the W-shaped cross section may remain the same in a longitudinal direction of the beam body 11. According to an exemplary embodiment, the beam body 11 may include a central web 21, and first and second apexes 23 and 24 symmetrically disposed at both sides of the central web 21. The central web 21 and the first and second apexes 23 and 24 may extend in the longitudinal direction of the beam body 11, and the central web 21 and the first and second apexes 23 and 24 may be rounded or curved with predetermined radii R1, R2, and R3, respectively.

A first inner sidewall 25 and a first outer sidewall 26 may be connected to both sides of the first apex 23. The first apex 23 may be connected to the central web 21 via the first inner sidewall 25, and the first outer sidewall 26 may be disposed on the opposite side of the first inner sidewall 25. The first outer sidewall 26 may have a curved flange 26a formed at an end portion thereof. A second inner sidewall 27 and a second outer sidewall 28 may be connected to both sides of the second apex 24. The second apex 24 may be connected to the central web 21 via the second inner sidewall 27, and the second outer sidewall 28 may be disposed on the opposite side of the second inner sidewall 27. The second outer sidewall 28 may have a curved flange 28a formed at an end portion thereof.

For example, when a steel sheet having a yield strength of about 1180 MPa or higher and a thickness of about 1 mm is formed by cold pressing in consideration of yield or formability, the radius R1 of the central web 21 and the radii R2 and R3 of the first and second apexes 23 and 24 may be about 7 mm or greater, and an angle a between the first inner sidewall 25 and the second inner sidewall 27 may be about 47°. The reinforcement portion 30 and the beam body 11 may be formed as a single unitary body by press molding, and a width of the reinforcement portion 30 may be greater than a width of the beam body 11. Thus, a cross-sectional area of the reinforcement portion 30 may be greater than a cross-sectional area of the beam body 11 and thus, the strength or support load of the door impact beam 10 may be increased.

The reinforcement portion 30 may extend to a predetermined length between the first portion 13 and the second portion 14 of the beam body 11. The reinforcement portion 30 may have first and second edges 41 and 42 that protrude convexly from both side of the reinforcement 30, respectively. The first and second edges 41 and 42 may be symmetrically convex with respect to a central axis of the reinforcement 30. The central axis of the reinforcement 30 may correspond to a central axis X of the beam body 11. The reinforcement portion 30 may have a center portion 43 disposed at the center of the door impact beam 10 in the longitudinal direction of the door impact beam 10. A first end 44 of the reinforcement portion 30 may meet with or directly connect with the first portion 13 of the beam body 11, and a second end 45 of the reinforcement portion 30 may meet or directly connect with the second portion 14 of the beam body 11.

The first edge 41 and the second edge 42 of the reinforcement portion 30 may be formed in a curved streamlined shape to prevent generation of a local concentrated load. Thus, the cross-sectional area and width of the reinforcement portion 30 may be gradually increased from the first portion 13 of the beam body 11 (e.g., the first end 44 of the reinforcement portion 30) to the center portion 43 of the reinforcement portion 30, and the cross-sectional area and width of the reinforcement portion 30 may be gradually increased from the second portion 14 of the beam body 11 (e.g., the second end 45 of the reinforcement portion 30) to the center portion 43 of the reinforcement portion 30.

Figure 4:
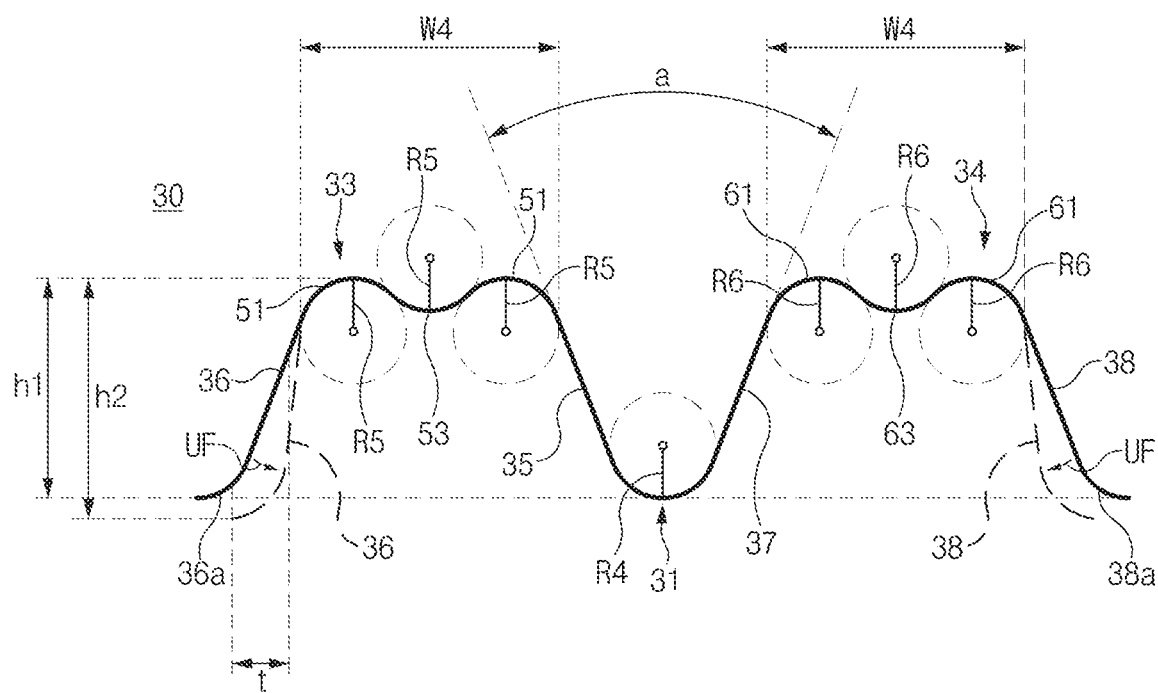
FIG. 4 illustrates a cross-sectional view, taken along line B-B of FIG. 2 according to an exemplary embodiment of the present disclosure.

Referring to FIG. 4, the reinforcement portion 30 may have a W-shaped cross section of which a width is greater than that of the W-shaped cross section of the beam body 11. According to an exemplary embodiment, the reinforcement portion 30 may include a central web 31, and first and second apexes 33 and 34 symmetrically disposed on both sides of the central web 31. The central web 31 and the first and second apexes 33 and 34 may extend in a longitudinal direction of the reinforcement portion 30.

The central web 31 of the reinforcement portion 30 may be continuously connected to the central web 21 of the beam body 11. The central web 31 may be rounded with a predetermined radius R4. According to an exemplary embodiment, the central web 31 of the reinforcement portion 30 and the central web 21 of the beam body 11 may have the same width. The first apex 33 of the reinforcement portion 30 may be continuously connected to the first apex 23 of the beam body 11. Additionally, a width W4 of the first apex 33 of the reinforcement portion 30 may be greater than a width W3 of the first apex 23 of the beam body 11. The width of the first apex 33 may be gradually increased from the first portion 13 and the second portion 14 of the beam body 11 to the center portion 43 of the reinforcement portion 30.

According to an exemplary embodiment, the first apex 33 of the reinforcement portion 30 may include a pair of first beads 51 and a first groove 53 disposed between the pair of first beads 51. The pair of first beads 51 may protrude at the same height, and the first groove 53 may be recessed to a predetermined depth. The strength of the first apex 33 may be reinforced by the pair of first beads 51 and the first groove 53 to prevent the cross section of the first apex 33 may be prevented from collapsing during side impacts. The pair of first beads 51 and the first groove 53 may be rounded with a predetermined radius R5.

A first inner sidewall 35 and a first outer sidewall 36 may be connected to both sides of the first apex 33. The first apex 33 may be connected to the central web 31 through the first inner sidewall 35, and the first outer sidewall 36 may be disposed on the opposite side of the first inner sidewall 35. The first outer sidewall 36 may have a curved flange 36a formed at an end portion thereof. The first outer sidewall 36 and the flange 36a may be disposed at one edge of the W-shaped cross section of the reinforcement portion 30, and thus, the first outer sidewall 36 and the flange 36a may form the first edge 41 as illustrated in FIGS. 1 and 2.

The second apex 34 of the reinforcement portion 30 may be continuously connected to the second apex 24 of the beam body 11. According to an exemplary embodiment, a width W4 of the second apex 34 of the reinforcement portion 30 may be greater than a width W3 of the second apex 34 of the beam body 11. The width of the second apex 34 may be gradually increased from the first portion 13 and the second portion 14 of the beam body 11 to the center portion 43 of the reinforcement portion 30.

Further, the second apex 34 of the reinforcement portion 30 may include a pair of second beads 61 and a second groove 63 disposed between the pair of second beads 61. The strength of the second apex 34 may be reinforced by the pair of second beads 61 and the second groove 63 to prevent the cross section of the second apex 34 from collapsing prematurely during side impacts. The pair of second beads 61 and the second groove 63 may be rounded with a predetermined radius R6.

A second inner sidewall 37 and a second outer sidewall 38 may be connected to both sides of the second apex 34. The second apex 34 may be connected to the central web 31 via the second inner sidewall 37, and the second outer sidewall 38 may be disposed on the opposite side of the second inner sidewall 37. The second outer sidewall 38 may have a curved flange 38a formed at an end portion thereof. The second outer sidewall 38 and the flange 38a may be disposed at the other edge of the W-shaped cross section of the reinforcement portion 30, and thus, the second outer sidewall 38 and the flange 38a may form the second edge 42 as illustrated in FIGS. 1 and 2.

For example, when a steel sheet having a yield strength of about 1180 MPa or higher and a thickness of about 1 mm is formed by cold pressing in consideration of yield or formability, the radius R4 of the central web 31, the radius R5 of the first bead 51 and the first groove 53 of the first apex 33, and the radius R6 of the second bead 61 and the second groove 63 of the second apex 34 may be about 7 mm or greater, and an angle a between the first inner sidewall 35 and the second inner sidewall 37 may be about 47°.

Figure 5:
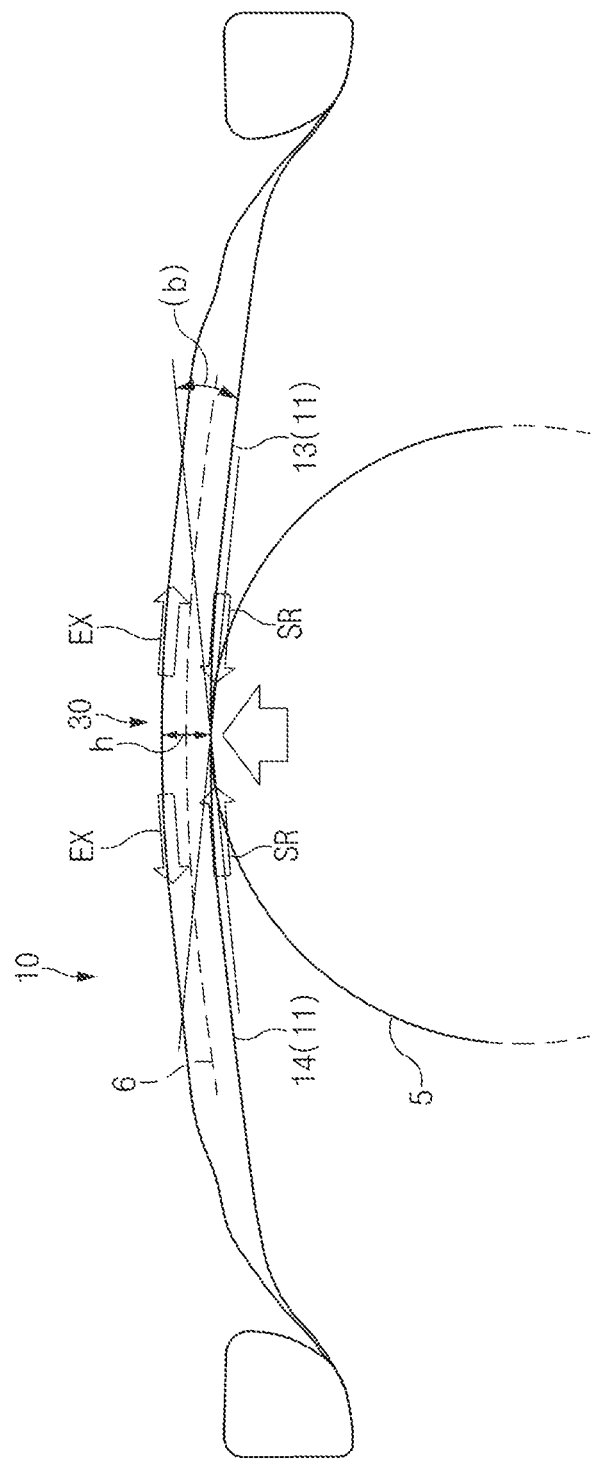
FIG. 5 illustrates a three point bending test in which bending (deformation) of a door impact beam occurs according to an exemplary embodiment of the present disclosure.

FIG. 5 illustrates a three point bending test in which bending (deformation) of the door impact beam 10 occurs as a ram 5 collides against the middle of the door impact beam 10 in the longitudinal direction. In the three point bending test, a region of the door impact beam 10 proximate to the ram 5 with respect to a center line 6 of the door impact beam 10 may be compressed in the longitudinal direction of the door impact beam 10 (see arrow SR in FIG. 5), and a region of the door impact beam 10 remote or distant from the ram 5 with respect to the center line 6 of the door impact beam 10 may be stretched or expanded in the longitudinal direction of the door impact beam 10 (see arrow EX in FIG. 5).

Figure 6:
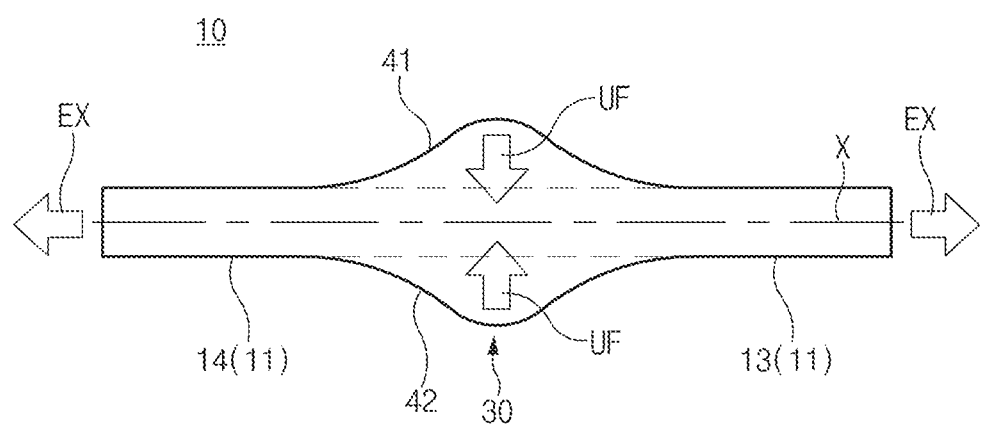
FIG. 6 illustrates a process of deformation of a reinforcement portion as a door impact beam according to an exemplary embodiment of the present disclosure is stretched in a longitudinal direction thereof.
Figure 7:
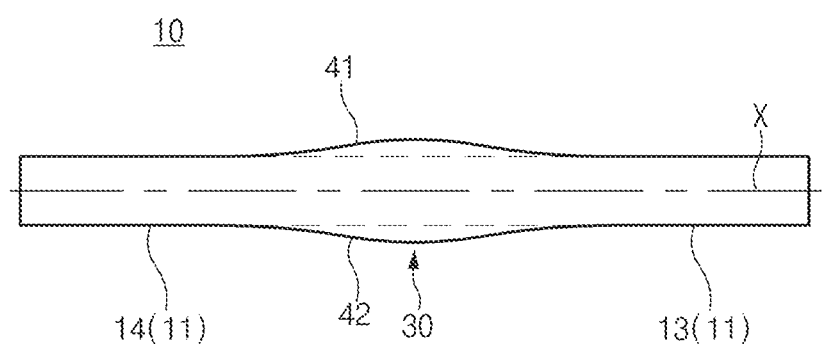
FIG. 7 illustrates a state in which a reinforcement portion of a door impact beam according to an exemplary embodiment of the present disclosure is deformed.

Moreover, since both ends of the door impact beam 10 are fixed, the door impact beam 10 may not be deformed in the longitudinal direction thereof, and the door impact beam 10 may be deformed in a width direction thereof. Thus, the width of the door impact beam 10 may vary based on bend angle b, thickness h, and the like of the door impact beam 10. As the door impact beam 10 is bent, the door impact beam 10 may be stretched or expanded in the direction of arrow EX as illustrated in FIG. 6. Therefore, the first and second edges 41 and 42 of the reinforcement portion 30 having the curved streamlined shape may be retracted toward the central axis X of the door impact beam 10 as illustrated in FIG. 7 (see arrow UF in FIGS. 4 and 6). The first outer sidewall 36 and the second outer sidewall 38 of the reinforcement portion 30 may be deformed (e.g., folded) toward the central axis X of the door impact beam 10 as indicated by a dotted line in FIG. 4 and thus, the first outer sidewall 36 and the second outer sidewall 38 may be extended vertically (see the dotted line in FIG. 4).

As the first outer sidewall 36 and the second outer sidewall 38 corresponding to both edges 41 and 42 of the door impact beam 10 are expanded vertically, a section modulus of the reinforcement portion 30 may be increased to improve the strength or support load of the reinforcement portion 30. As the first and second beads 51 and 61 are formed at the first and second apexes 33 and 34 of the reinforcement portion 30, respectively, the first and second apexes 33 and 34 may be prevented from collapsing before the first outer sidewall 36 and the second outer sidewall 38 corresponding to both edges 41 and 42 of the reinforcement portion 30 are deformed by an external impact.

Figure 8:
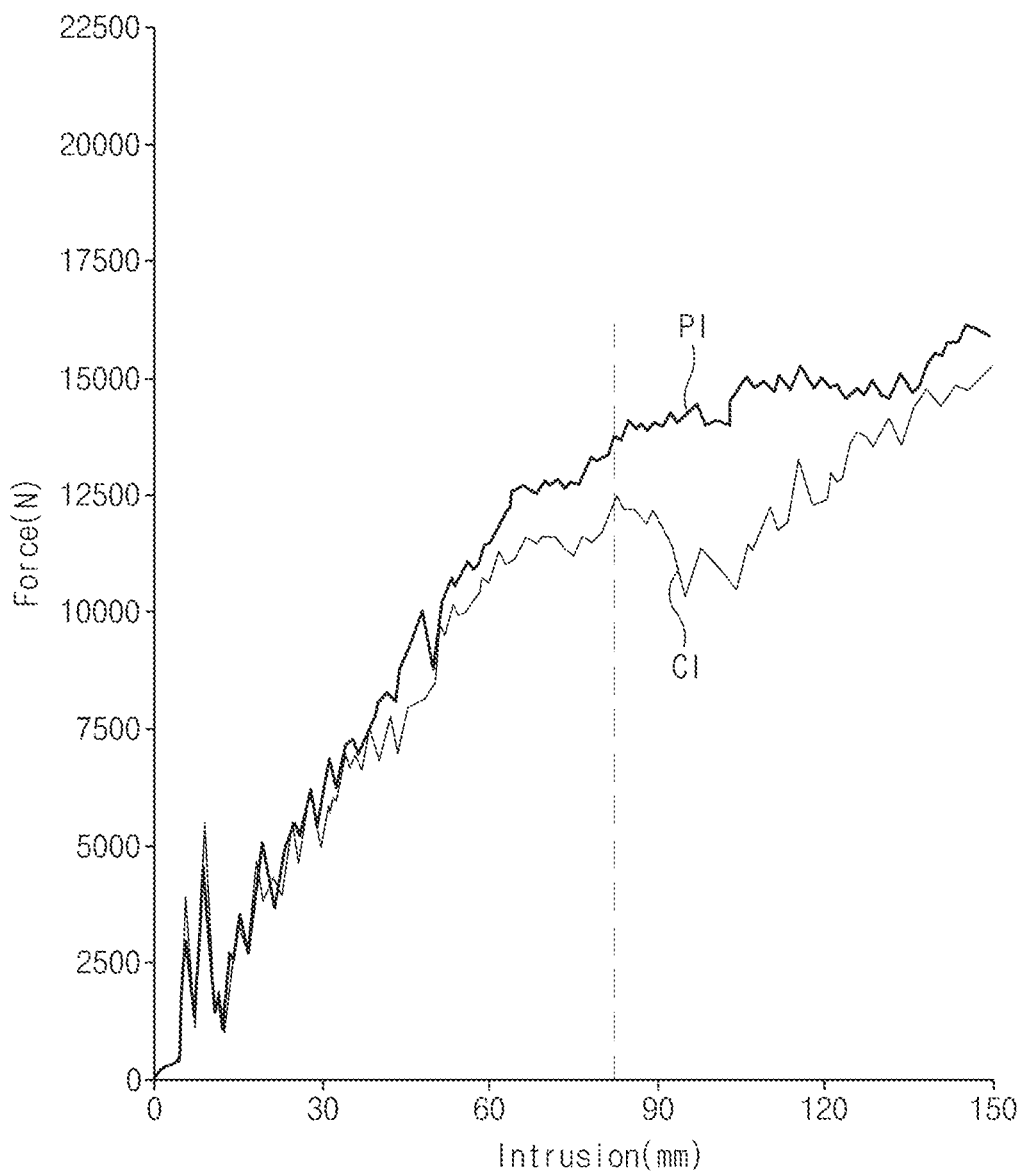
FIG. 8 illustrates support loads of a door impact beam according to the related art and a door impact beam according to an exemplary embodiment of the present disclosure with respect to an intrusion distance of a ram in a three point bending test.

FIG. 8 illustrates support loads of a door impact beam according to the related art and a door impact beam according to an exemplary embodiment of the present disclosure with respect to an intrusion distance of a ram in a three point bending test. As illustrated in FIG. 8, it the support load (see line PI in FIG. 8) of the door impact beam 10 according to the exemplary embodiment of the present disclosure is greater than the support load (see line CI in FIG. 8) of the door impact beam according to the related art.

When the door impact beam according to the related art is bent by an external force applied thereto, the door impact beam may be unfolded in a lateral direction and a height of a cross section of the door impact beam may be decreased, and thus, a section modulus of the door impact beam may be reduced causing the support load thereof to be decreased. However, when the door impact beam 10 according to the exemplary embodiment of the present disclosure is bent by an external force applied to the reinforcement portion 30 of the door impact beam 10, the first and second edges 41 and 42 of the reinforcement portion 30 in the door impact beam 10 may be retracted toward the central axis X of the door impact beam 10 as indicated by dotted lines in FIGS. 7 and 4.

As the first and second outer sidewalls 36 and 38 are folded toward the central axis X of the door impact beam 10 as indicated by the dotted line in FIG. 4, the first and second outer sidewalls 36 and 38 may be moved toward the central axis X of the door impact beam 10 by a predetermined distance t in a horizontal direction. Accordingly, the first and second outer sidewalls 36 and 38 may be extended vertically, and the height of the reinforcement portion 30 may be increased from an initial height h1 to a deformation height h2, and thus, the section modulus of the reinforcement portion 30 may be increased thereby increasing the strength or support load thereof.

Figure 9:
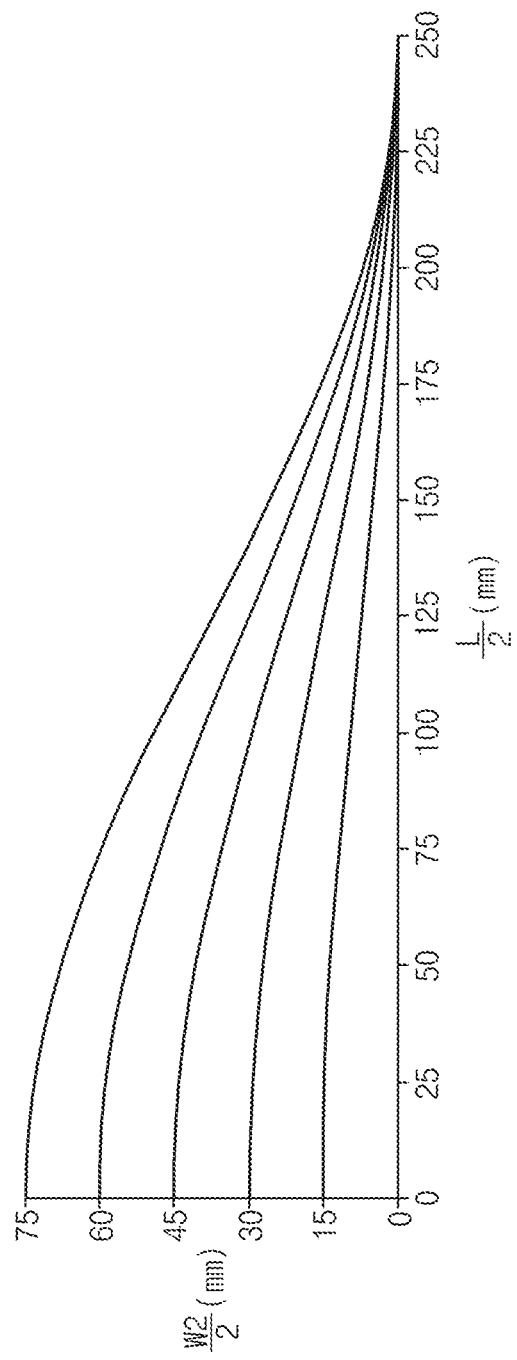
FIG. 9 illustrates the shape of one edge of a reinforcement portion according to a first example according to an exemplary embodiment of the present disclosure.
Figure 10:
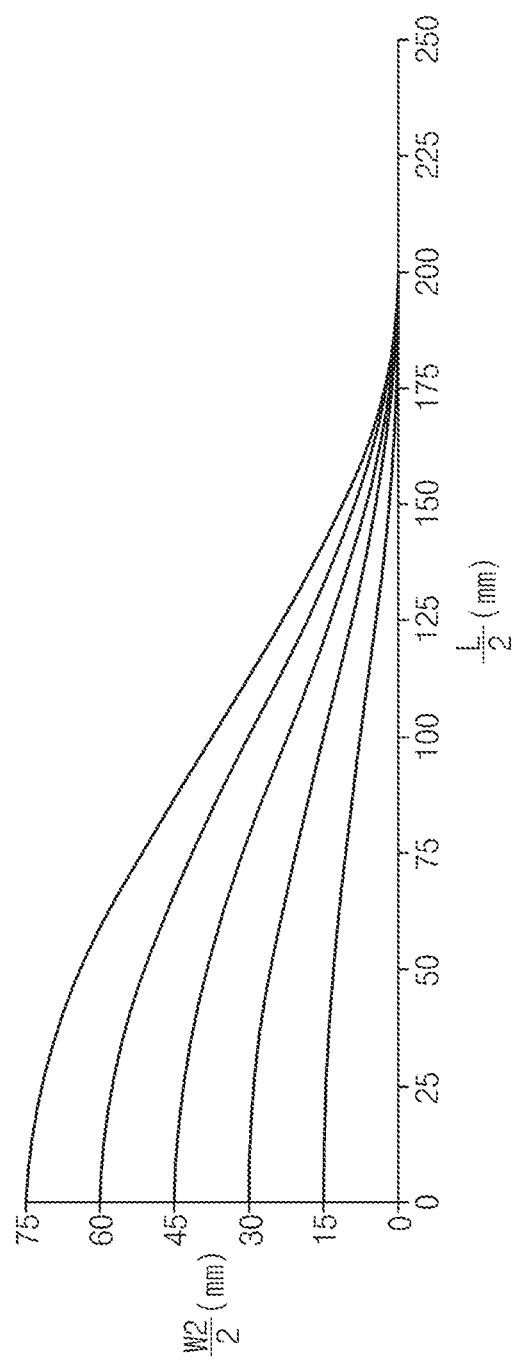
FIG. 10 illustrates the shape of one edge of a reinforcement portion according to a second example according to an exemplary embodiment of the present disclosure.
Figure 11:
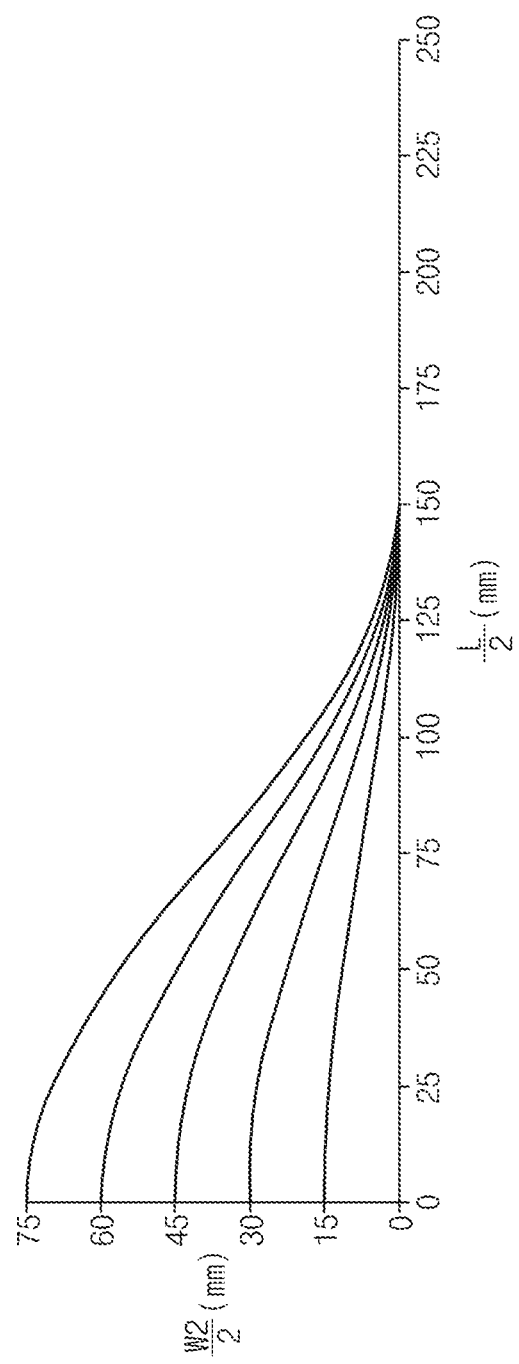
FIG. 11 illustrates the shape of one edge of a reinforcement portion according to a third example according to an exemplary embodiment of the present disclosure.

FIGS. 9 to 11 illustrate the shape of one edge of the reinforcement portion 30 that varies based on length and width of the reinforcement portion 30. In FIGS. 9 to 11, a horizontal axis represents a length from the center portion 43 of the reinforcement portion 30 to one end 44 of the reinforcement portion 30 corresponding to a half (L/2) of a length L of the reinforcement portion 30, and a vertical axis represents a half (W2/2) of a width W2 of the center portion 43 of the reinforcement portion 30.

FIG. 9 illustrates an example in which the length of the door impact beam 10 is about 0.5 to 1 m, the length L of the reinforcement portion 30 is about 500 mm, and the width W2 of the center portion 43 of the reinforcement portion 30 is changed to about 30 mm, 60 mm, 90 mm, 120 mm, or 150 mm. As illustrated in FIG. 9, when the length from the center portion 43 of the reinforcement portion 30 to a first end 44 of the reinforcement portion 30, that is, the half (L/2) of the length L of the reinforcement portion 30 is about 250 mm, as the half (W2/2) of the width W2 of the center portion 43 of the reinforcement portion 30 is changed to about 15 mm, 30 mm, 45 mm, 60 mm, or 75 mm, the shape of one edge of the reinforcement portion 30 may be changed to a streamlined shape of various sine waves.

FIG. 10 illustrates an example in which the length of the door impact beam 10 is about 0.5 to 1 m, the length L of the reinforcement portion 30 is about 400 mm, and the width W2 of the center portion 43 of the reinforcement portion 30 is changed to about 30 mm, 60 mm, 90 mm, 120 mm, or 150 mm. As illustrated in FIG. 10, when the length from the center portion 43 of the reinforcement portion 30 to a first end 44 of the reinforcement portion 30, that is, the half (L/2) of the length L of the reinforcement portion 30 is 200 mm, as the half (W2/2) of the width W2 of the center portion 43 of the reinforcement portion 30 is changed to about 15 mm, 30 mm, 45 mm, 60 mm, or 75 mm, the shape of one edge of the reinforcement portion 30 may be changed to a streamlined shape of various sine waves.

FIG. 11 illustrates an example in which the length of the door impact beam 10 is about 0.5 to 1 m, the length L of the reinforcement portion 30 is about 300 mm, and the width W2 of the center portion 43 of the reinforcement portion 30 is changed to about 30 mm, 60 mm, 90 mm, 120 mm, or 150 mm. As illustrated in FIG. 11, when the length from the center portion 43 of the reinforcement portion 30 to a first end 44 of the reinforcement portion 30, that is, the half (L/2) of the length L of the reinforcement portion 30 is about 150 mm, as the half (W2/2) of the width W2 of the center portion 43 of the reinforcement portion 30 is changed to about 15 mm, 30 mm, 45 mm, 60 mm, or 75 mm, the shape of one edge of the reinforcement portion 30 may be changed to a streamlined shape of various sine waves.

As illustrated in FIGS. 9 to 11, the shape of one edge of the reinforcement portion 30 may be changed to the streamlined shape of various sine waves based on the length L and width W2 of the reinforcement portion 30.

Figure 12:
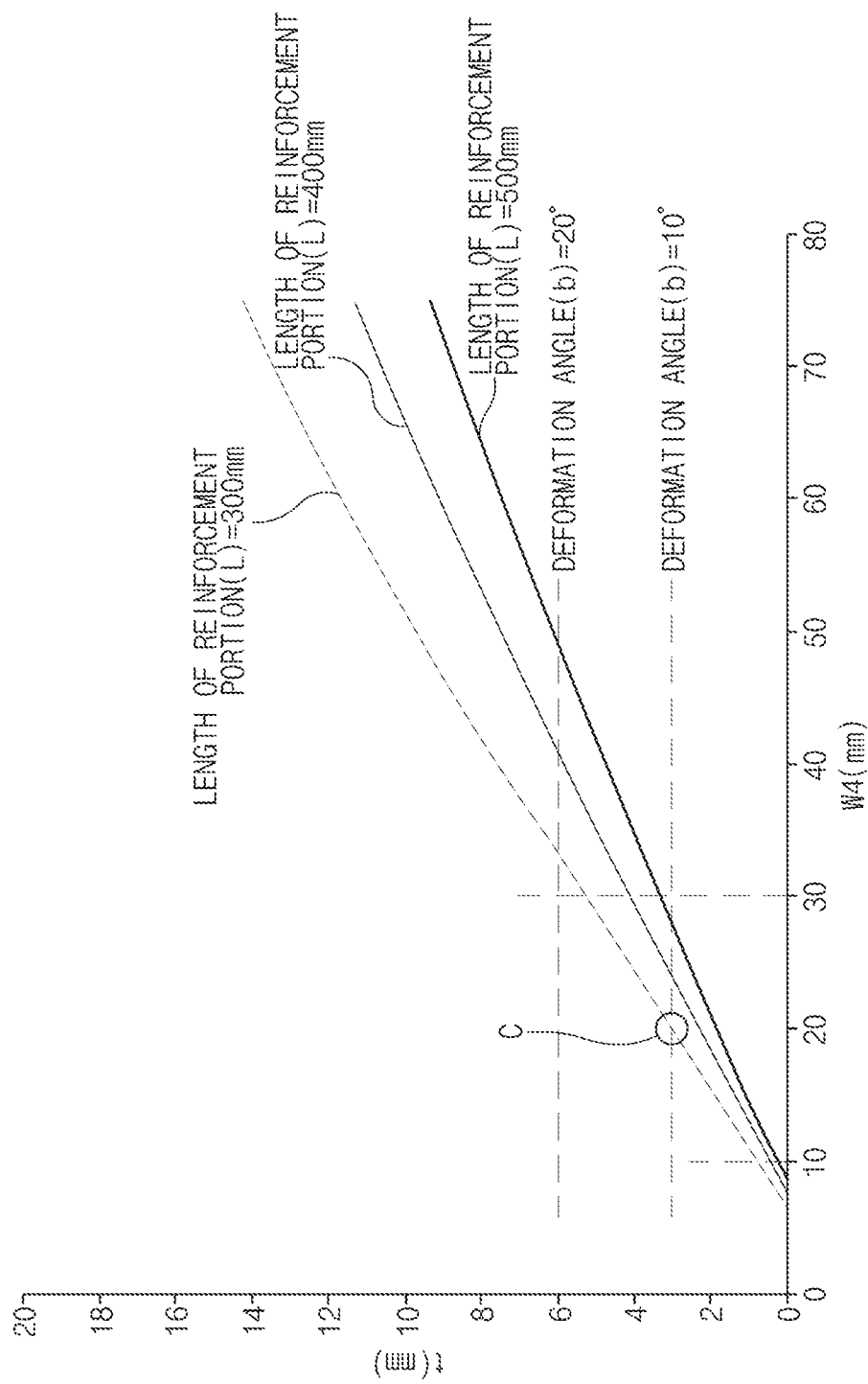
FIG. 12 illustrates a graph of variations in deformation distance of a reinforcement portion depending on a length of the reinforcement portion, a width of each apex, and a deformation angle; according to an exemplary embodiment of the present disclosure

FIG. 12 illustrates a graph of variations in deformation distance t of the first and second outer sidewalls 36 and 38 of the reinforcement portion 30 moving toward the central axis X of the door impact beam 10 in the horizontal direction, based on the length L of the reinforcement portion 30, the width W4 of the first and second apexes 33 and 34 of the reinforcement portion 30, and the deformation angle b of the door impact beam 10. In FIG. 12, a horizontal axis represents the width W4 of the first and second apexes 33 and 34 of the reinforcement portion 30, and a vertical axis represents the deformation distance t. For example, as indicated by a circle portion C illustrated in FIG. 12, when the length L of the reinforcement portion 30 is about 300 mm and the width W4 of the first and second apexes 33 and 34 of the reinforcement portion 30 is about 20 mm, the deformation distance t of the first and second outer sidewalls 36 and 38 may be about 3 mm at a deformation angle b of about 10°.

As illustrated in FIG. 12, when the width W4 of the first and second apexes 33 and 34 is about 10 mm, the deformation distance t may be greater than 0 mm, and thus the first and second outer sidewalls 36 and 38 of the reinforcement portion 30 are not unfolded. When the width W4 of the first and second apexes 33 and 34 exceeds about 30 mm, the amount of the steel sheet to be processed may increase, and accordingly the manufacturing cost may increase. Thus, the width W4 of the first and second apexes 33 and 34 may be set to about 10 mm to 30 mm. Thus, a ratio of the width W4 of the first and second apexes 33 and 34 to the length L of the reinforcement portion 30 may be ⅕₀ to ⅒.

Figure 13:
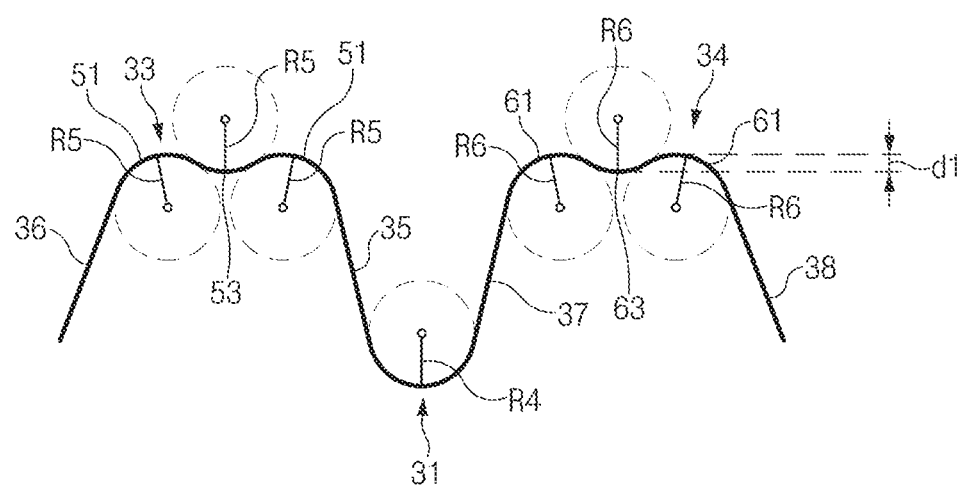
FIG. 13 illustrates an example of the shape of a W-shaped cross section of a door impact beam according to an exemplary embodiment of the present disclosure.

As for small vehicles, the size of the vehicle door is smaller as well and the length of the door impact beam is short, and thus, a bending moment arm is decreased which reduces a required section moment or a required bending load. As illustrated in FIG. 13, the first and second grooves 53 and 63 of the first and second apexes 33 and 34 may have a first depth d1 which is relatively shallow to improve formability, and thus the manufacturing cost may be reduced.

Figure 14:
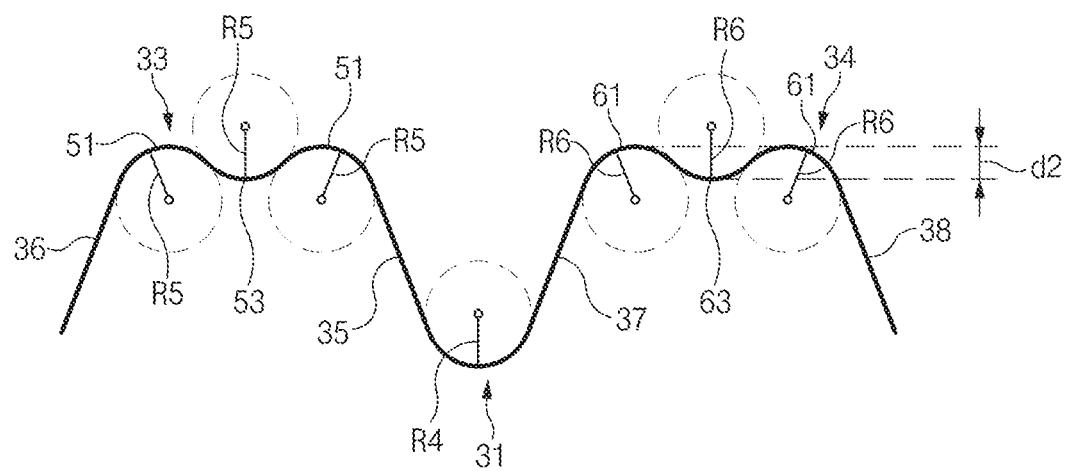
FIG. 14 illustrates another example of the shape of a W-shaped cross section of a door impact beam according to an exemplary embodiment of the present disclosure.

As for midsize or large vehicles, the size of the vehicle door is increased and the length of the door impact beam is relatively long, and thus, a bending moment aim increases which increases a required section moment or a required bending load. As illustrated in FIG. 14, the first and second grooves 53 and 63 of the first and second apexes 33 and 34 may have a second depth d2 which is relatively deep to prevent local deformation when an external force is applied, and thus resistance to the bending moment of the door impact beam may be improved. The first and second grooves 53 and 63 may be set to relative depth in proportion to the size of the vehicle door and/or the depth d1 or d2 of the door impact beam.

As set forth above, according to exemplary embodiments of the present disclosure, as the reinforcement portion 30 is integrated into the middle of the beam body 11, the cross section of the beam body 11 may gradually change. Due to such a change, the strength or support load of the door impact beam 10 may be increased, and the resistance to the bending moment may be increased, thereby preventing or reducing a sharp edge phenomenon in which the center of the door impact beam is sharply bent during a side impact. In addition, according to exemplary embodiments of the present disclosure, the first and second beads 51 and 61 formed at the first and second apexes 33 and 34 of the reinforcement portion 30 may prevent the first and second apexes 33 and 34 from collapsing before the first and second edges 41 and 42 of the reinforcement portion 30 are deformed by an external impact.

According to exemplary embodiments of the present disclosure, as the support strength of the door impact beam is increased by the reinforcement portion 30, the thickness of the cross section may be made relatively thin, and thus weight reduction and cost reduction may be achieved. Additionally, as the reinforcement portion 30 and the beam body 11 are formed as a single unitary body by cold pressing, without the use of welding or the like, the possibility of fracture may be decreased.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A door impact beam, comprising:
   a beam body having a W-shaped cross section; and
   a reinforcement portion disposed in middle of the beam body and having a width greater than that of the beam body,
   wherein the reinforcement portion has first and second edges symmetrically convex with respect to a central axis of the beam body,
   wherein the first and second edges have a curved streamlined shape,
   wherein the reinforcement portion includes a central web and a pair of apexes symmetrically disposed on both sides of the central web, and
   wherein each apex of the reinforcement portion has a pair of beads and a groove disposed between the pair of beads, and the pair of beads have the same height.

2. The door impact beam according to claim 1, wherein the reinforcement portion has a W-shaped cross section of which a width is greater than that of the W-shaped cross section of the beam body.

3. The door impact beam according to claim 1, wherein each bead and the groove are rounded with a predetermined radius.

4. The door impact beam according to claim 3, wherein both sides of each apex of the reinforcement portion are connected to an inner sidewall and an outer sidewall, respectively.

5. The door impact beam according to claim 4, wherein the beam body includes:
   a central web; and
   first and second apexes symmetrically disposed on both sides of the central web.

6. The door impact beam according to claim 5, wherein the central web and the first and second apexes of the beam body are rounded with a predetermined radius.

7. The door impact beam according to claim 6, wherein the beam body is divided into a first portion and a second portion by the reinforcement portion.

8. The door impact beam according to claim 7, wherein the reinforcement portion includes a center portion disposed at the center of the door impact beam in a longitudinal direction of the door impact beam, and a first end of the reinforcement portion connects with the first portion of the beam body, and a second end of the reinforcement portion connects with the second portion of the beam body.

9. The door impact beam according to claim 8, wherein each apex of the reinforcement portion is continuously connected to each apex of the beam body, and a width of each apex of the reinforcement portion is greater than that of each apex of the beam body.

10. The door impact beam according to claim 9, wherein the central web of the reinforcement portion is continuously connected to the central web of the beam body.

* * * * *